March 17, 1925.
E. G. MINNEMAN
1,530,279
PASTRY TOOL
Filed Oct. 27, 1924
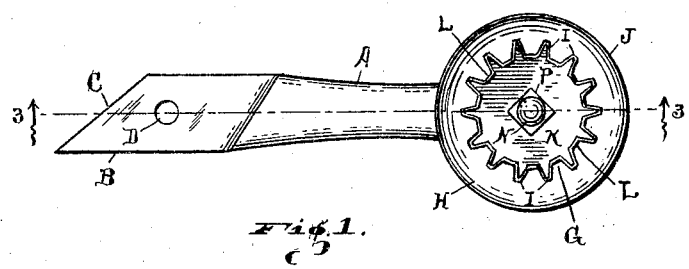
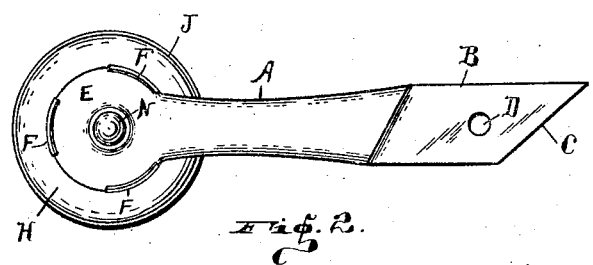
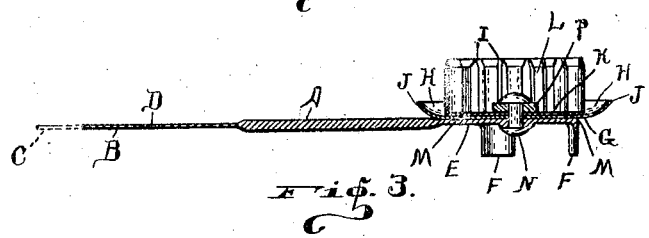
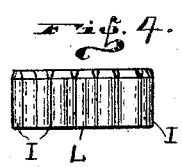
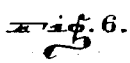
Inventor:
Edward G. Minneman;
By Robert W. Laudle,
Attorney.

Patented Mar. 17, 1925.

1,530,279

UNITED STATES PATENT OFFICE.

EDWARD G. MINNEMAN, OF RICHMOND, INDIANA.

PASTRY TOOL.

Application filed October 27, 1924. Serial No. 745,954.

*To all whom it may concern:*

Be it known that I, EDWARD G. MINNEMAN, a citizen of the United States, residing in the city of Richmond, county of Wayne, State of Indiana, have invented a new and useful Pastry Tool, of which the following is a full, clear, and comprehensive specification and exposition, the same being such as will enable others to make and use the same with exactitude.

The objects, broadly stated, of my present invention is the provision of a tool or utensil to be employed in the manufacture or production of pastry products, the same being simple in character, easily comprehended and operated, capable of a variety of uses, and which can be manufactured and sold at a comparatively low price.

More specifically stated, my object is the provision of a device to be employed for utilitarian results and for the artistic embellishment of pies, cakes, and other pastry products, to be applied during the manufacture thereof.

Other minor objects and particular advantages of the invention will suggest themselves in the course of the following description, and that which is new will be correlated in the appended claims.

The preferred means for carrying out the principles of my invention in a practical and economical manner, is shown in the accompanying drawings, in which—Figure 1 is a face view of my entire device; Figure 2 is a back or rear view of the same; Figure 3 is a longitudinal section of the same, as taken on the line 3—3 of Fig. 1; Figure 4 shows the crimper member alone; Figure 5 shows the cutter member alone; and Figure 6 shows the handle portion alone.

Similar indices denote like parts throughout the several views.

In order that the construction, the operation, and the several advantages of my invention may be fully understood and appreciated I will now take up a detailed description thereof, in which I will set forth the same as comprehensively as I may.

My present invention consists of three distinct parts: The handle member; the cutter member, and the crimper member.

The handle member comprises the handle proper denoted by letter A, whose outer or free end portion forms a blade B, whose edge C is formed at an angle with relation to the handle proper. Letter D denotes an aperture to receive a stationary hook or the like by which the device may be suspended. Integral with the inner end of the handle A is the disc portion E. Turned back at right-angles thereto from the edge of the disc E are a plurality of cutters F.

The cutter member comprises a flat disc portion G, with a blade H which curves slightly forward and terminates in the circular edge J which is concentric with the disc portion G.

The crimper member is cup-shaped, and it comprises a disk K, adapted to contact with the disc G, and from the periphery of the disk K a flange L extends forward at substantially right-angles thereto, and said flange is crimped, or otherwise bent, to form teeth I, and said flange and the ends of the teeth I are shaped to form a cutting edge.

The said parts are to be assembled as follows: The cutter member, shown alone in Fig. 5, and the crimper member, shown alone in Fig. 4, are first rigidly secured together by means of rivets M, or otherwise, whereby the discs G and K are in contact and concentric with each other.

Letter N denotes the pivot or center rivet, which is disposed through apertures in the center of the discs G, K and E, and a washer P which is located in contact with the inner face of the disk K.

We now have the cutter member and the crimper so mounted, as to form a single unit, that it will revolve on the pivot N, with the disk G revolving in contact with the disc E.

As an example of the operation of the tool, we will take for instance the making of pies, in which case the dough is first rolled out to the proper thickness, the edge C of the blade B may be used to run under the rolled dough to release it from the board on which it was rolled, so that it may be easily grasped by the operator. After the lower crust dough has been placed in a pan, the second crust dough may be cut at various places by means of the cutters F, or the edge C of the blade B, or by the ends of the flange L and the teeth I, to provide a decorative or artistic effect and also to provide means for the escape of steam from the interior of the pie when it is being baked.

After both the bottom and the top crust dough has been placed in position, then the device may be taken in one's hand by means of the handle and then run around, with the inner face of the cutter blade H in shearing contact with the edge of the rim of the pie-pan, and at the same time the teeth I will revolve in contact with the dough on top of the rim of the pan. As the tool travels forward it will be seen that the surplus dough will be cut away even with the rim of the pan, and the two thicknesses of dough on top of the pan rim will be crimped and pressed together whereby the pie will not leak and at the same time giving the edge of the pie an artistic effect.

It will be realized that my tool may be used for various purposes other than that in the making of pies.

I desire that it be understood that various changes may be made in the several details of construction without departing from the spirit of the invention and without sacrificing any of the advantages thereof which are new and useful.

Having now fully shown and described my invention, what I claim and desire to secure by Letters Patent of the United States, is—

1. A pastry tool, a handle, a circular cutter pivoted to the handle, a cup-shaped crimper member rigidly secured to and concentric with said cutter, teeth formed by the wall of the cup-shaped member, said teeth being at substantially right-angles to said cutter.

2. A pastry tool comprising a handle, a disc integral with the inner end of the handle, a second disc, a cutting blade on the periphery of the second disc, a third disc, a flange extending at right-angles thereto from the periphery of the third disc, teeth formed by said flange, means for rigidly securing the second and the third discs together, and means for pivotedly connecting the first disc to the second and third discs.

3. A pastry tool comprising a handle, a circular cutter pivoted to the handle, a cupped crimper member secured to and concentric with said cutter, and teeth formed by the wall of the crimper member, said teeth being at substantially right-angles to said cutter.

In testimony whereof I have hereunto subscribed my name.

EDWARD G. MINNEMAN.